United States Patent
Yu

(10) Patent No.: US 6,584,143 B2
(45) Date of Patent: Jun. 24, 2003

(54) METHOD AND APPARATUS FOR JOINT DETECTION OF A CODED SIGNAL IN A CDMA SYSTEM

(75) Inventor: Xiaoyong Yu, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 254 days.

(21) Appl. No.: 09/798,305

(22) Filed: Mar. 2, 2001

(65) Prior Publication Data

US 2002/0150148 A1 Oct. 17, 2002

(51) Int. Cl.[7] .................. H04B 1/707; H03M 13/29; H04L 1/00
(52) U.S. Cl. .................. 375/147; 375/233; 375/340; 714/794
(58) Field of Search .................. 375/140, 144, 375/147, 148, 233, 260, 340, 346, 348, 350; 714/758, 766, 792, 794

(56) References Cited

U.S. PATENT DOCUMENTS

| | | | | |
|---|---|---|---|---|
| 5,812,601 A | * | 9/1998 | Schramm | 375/262 |
| 6,166,667 A | * | 12/2000 | Park | 341/94 |
| 6,182,261 B1 | * | 1/2001 | Haller et al. | 714/758 |
| 6,188,735 B1 | * | 2/2001 | Soichi et al. | 375/341 |

FOREIGN PATENT DOCUMENTS

| | | |
|---|---|---|
| EP | 0 946 024 A1 | * 9/1998 |
| WO | WO 02 084965 A1 | * 10/2002 |

OTHER PUBLICATIONS

Klein et al. "Zero Forcing and Minimum Mean–Square–Error Equalization for Multiuser Detection in Code–Devision Multiple–Access channels." IEEE Transation on vehicular Technology, vol. 45, No. 2, May 1996, pp. 276–287.*

Kaleh "Zero–Forcing Decision–Feedback Equalizer for Packet Data Transmission." Ecole Nationale Superieure des Telecommunications, 46, rue Barrault, 75 634 Paris 13, France, pp. 1752–1756.*

* cited by examiner

Primary Examiner—Young T. Tse
(74) Attorney, Agent, or Firm—Jeffrey K. Jacobs

(57) ABSTRACT

The present invention addresses the deficiencies of prior art joint detection techniques by implementing the decision feedback equalizer part of a joint detector in the turbo decoding iteration loop such that joint detection and turbo decoding are performed interactively in a mutual support fashion. Thus, the decoder (230) benefits from ISI and MAI suppressed samples provided by the equalizer, while the decision feedback equalizer is fed with more reliable hard decisions for the transmitted symbols by the turbo decoder.

15 Claims, 4 Drawing Sheets

FIG. 1 —PRIOR ART—

METHOD AND APPARATUS FOR JOINT DETECTION OF A CODED SIGNAL IN A CDMA SYSTEM

CROSS-REFERENCE TO RELATED APPLICATION

This application is related to a co-pending application, "TURBO DECODER WITH DECISION FEEDBACK EQUALIZATION", Ser. No. 09/563,064, filed on Apr. 24, 2000, now U.S. Pat. No. 6,307,901 B1, assigned to the assignee of the present application, which prior application is hereby incorporated by reference verbatim, with the same effect as though the prior application were fully and completely set forth herein.

FIELD OF THE INVENTION

The present invention relates generally to communication systems and, in particular, to joint detection of a coded signal in a CDMA system.

BACKGROUND OF THE INVENTION

FIG. 1 depicts a discrete time baseband model 100 of a known CDMA system that supports K block transmission users. These users have simultaneous access to the same physical, frequency-defined channel and transmit data block by block, each block having N symbols. Each user, 1 through K, has a sequence of information bits, $d^{(1)}$ through $d^{(K)}$, to be transmitted. Each user's sequence is first turbo encoded and mapped to channel symbol sequences $s^{(1)}$ through $s^{(K)}$ respectively. These channel symbol sequences are then spread by their corresponding code $C^{(1)}$ through $C^{(K)}$, each of which has Q random chips, and passed through their corresponding channel, characterized by impulse responses $h^{(1)}$ through $h^{(K)}$ with W taps at chip level. For simplicity, it is assumed that this system uses BPSK modulation, so $s^{(1)}$ through $s^{(K)}$ are sequences of 1 and −1, and the physical channel is an additive white Gaussian noise (AWGN) channel.

At the receive end, the received signal r can be expressed:

$$r = \sum_{k=1}^{K} s^{(k)} C^{(k)} \otimes h^{(k)} + n$$
$$= As + n$$

where r is a summation of K sequences and n represents channel noise, each of the length (NQ+W−1). A is a (NQ+W−1) by NK matrix consisting of:

$$a^{(k)} = (a_1^{(k)}, a_2^{(k)}, \ldots, a_{Q+W-1}^{(k)}) = C^{(k)} \otimes h^{(k)}$$

and s is a composite symbol vector combining all symbols of the K users and arranged in the following order:

$$s = (s_1^{(1)}, s_1^{(2)}, \ldots, s_1^{(K)}, s_2^{(1)}, s_2^{(2)}, \ldots, s_2^{(K)}, s_3^{(1)}, \ldots, s_N^{(1)}, \ldots, s_N^{(K)})^T$$

where T denotes the transposition operation. The received signal r is passed through a bank of matched filters, each one matches $a^{(k)}$. The output of the matched filter bank, y, is a minimum sufficient statistic of transmitted signals for all K users and can be expressed as:

$$y = A^H r = A^H A s + z = R s + z$$

where y, s, and z are NK by 1 vectors, and R is an NK by NK block toeplitz matrix. By using Cholesky factorization, R can be written as:

$$R = L L^H = L_n D L_n^H$$

where L is a lower triangular matrix, $L_n$ denotes a normalized L in which all elements of the diagonal are ones, and D represents a diagonal matrix.

Joint detection is known to be an optimal receiver for CDMA systems. One well-known joint detector is implemented using a zero-forcing block linear equalizer (ZF-BLE). Its output may be expressed as:

$$s_{ZF-BLE} = R^{-1} y = L^{-H} L^{-1} y = L_n^{-H} D^{-1} L_n^{-1} y$$

In practice, inversion of lower and upper triangular matrices can be achieved by forward and backward substitution. Therefore, by using Cholesky factorization, no actual matrix inversion is needed for joint detection. Another well-known joint detection technique, zero-forcing block decision feedback equalization (ZF-BDFE), is derived from ZF-BLE by using quantized previous samples, according to the symbol alphabet, in the backward substitution corresponding to the operation of $L_n^{-H}$.

With regard to performance, ZF-BLE joint detection suffers from noise enhancement and thus performs very poorly in bad channel conditions where frequency response has a deep notch. ZF-BDFE joint detection does not have this drawback and therefore usually outperforms ZF-BLE joint detection. However, since the hard decision in conventional ZF-BDFE joint detection is generated by a simple slicer, the performance of ZF-BDFE joint detection will also degrade if the received signal-to-noise-ratio (SNR) is low. Because of its many performance advantages, $3^{rd}$ generation (3G) mobile systems will use turbo encoded signaling. However, turbo encoded signaling exhibits a low SNR. Thus, a method and apparatus for joint detection of coded signaling in CDMA systems is needed to address the deficiencies of the prior art joint detection techniques, especially with respect to 3G systems.

DESCRIPTION OF A PREFERRED EMBODIMENT

The present invention addresses the deficiencies of prior art joint detection techniques by implementing the decision feedback equalizer part of a joint detector in the turbo decoding iteration loop such that joint detection and turbo decoding are performed interactively in a mutual support fashion. Thus, the turbo decoder benefits from samples with suppressed intersymbol interference (ISI) and multiple access interference (MAI) provided by the equalizer, while the decision feedback equalizer is fed with more reliable hard decisions for the transmitted symbols by the turbo decoder.

The present invention encompasses a method for joint detection of a coded input signal in CDMA system. The method comprises slicing the coded input signal to generate a first undesired signal and subtracting the first undesired signal from the coded input signal to produce a first decoder input signal. The first decoder input signal is demultiplexed to produce a plurality of decoder input signal portions (each of which corresponds to a decoder of a plurality of decoders) and decoded to produce a first set of recovered symbols. A second undesired signal is generated from the first set of recovered symbols and is subtracted from the coded input signal to produce a second decoder input signal. The second decoder input signal is demultiplexed and decoded to produce a second set of recovered symbols.

The present invention also encompasses a joint detector apparatus. This apparatus comprises a signal adder capable of adding a first undesirable signal to an input signal to produce a decoder input signal and a plurality of decoders, wherein each decoder is capable of decoding a portion of the decoder input signal to produce recovered symbols. The apparatus also comprises a demultiplexer capable of feeding each portion of the decoder input signal to a corresponding decoder of the plurality of decoders, a recovered symbols buffer capable of storing the recovered symbols, a selector, and a signal generator capable of generating a second undesired signal from the recovered symbols for addition to the input signal to produce a second decoder input signal when the recovered symbols buffer is selected by the selector. In addition, the apparatus also comprises a slicer capable of slicing an adder output signal to produce the first undesirable signal via the signal generator when selected by the selector.

Figure 1:
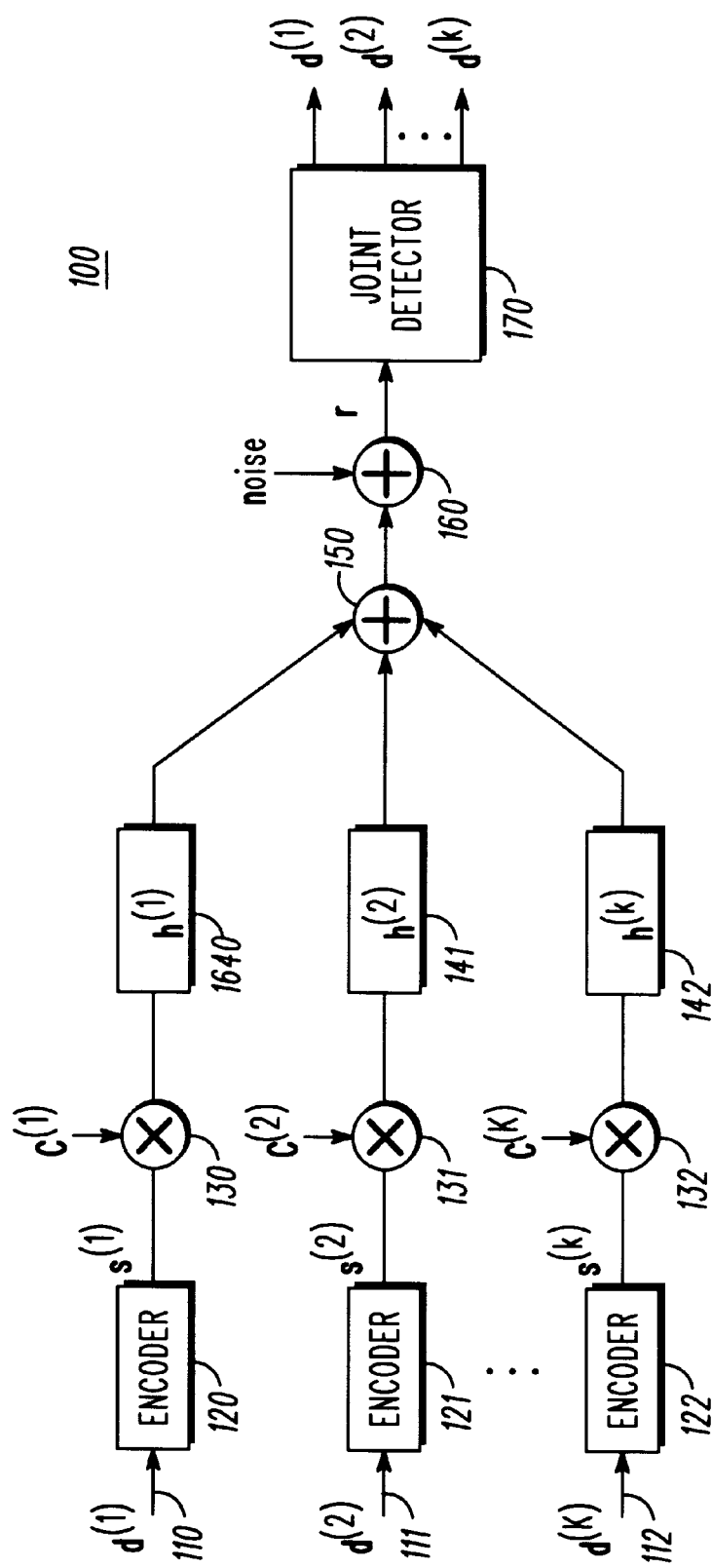
FIG. 1 is a discrete time baseband model of a known CDMA system that supports K block transmission users.
Figure 2:
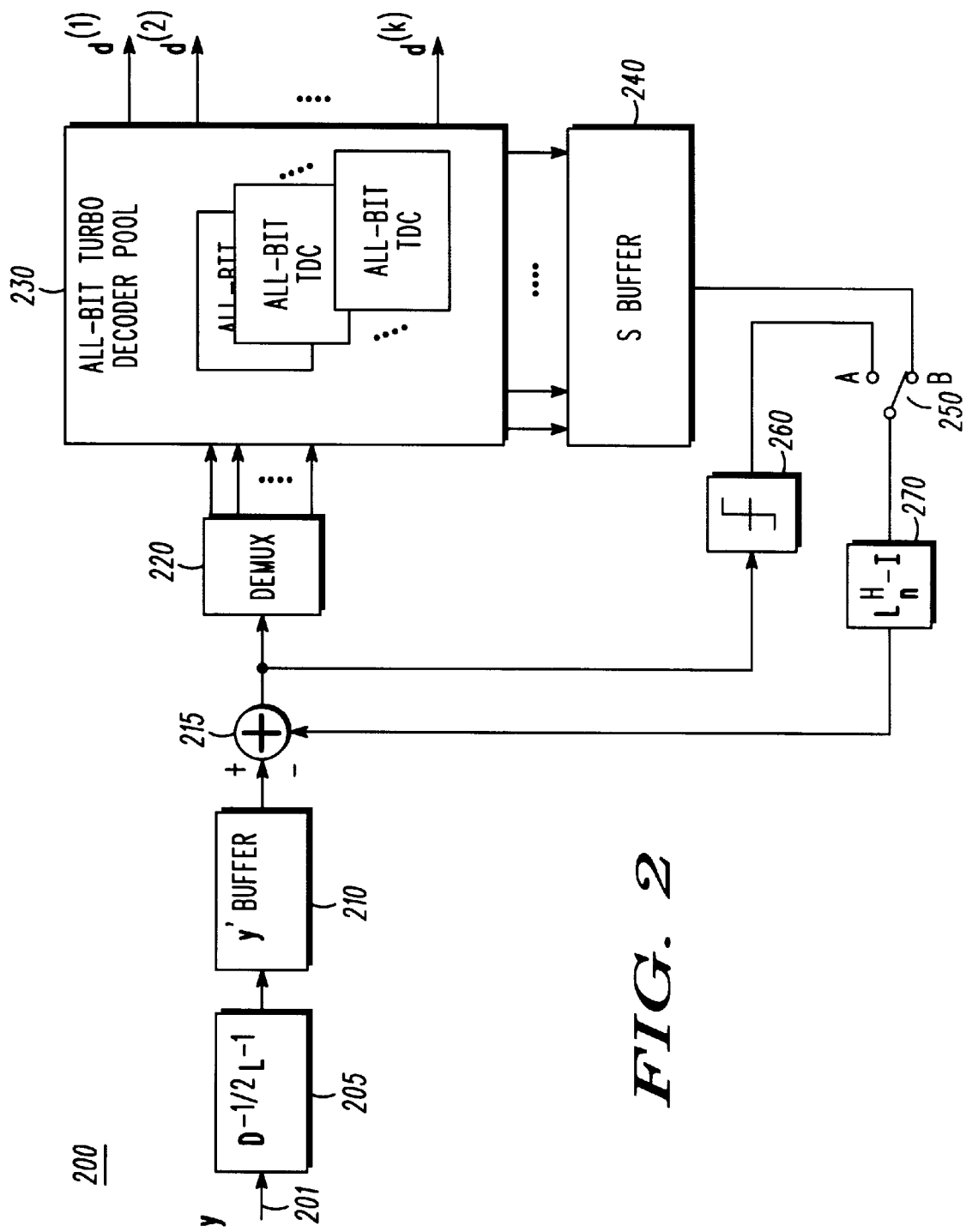
FIG. 2 is a block diagram depiction of a joint detector in accordance with a preferred embodiment of the present invention.
Figure 3:
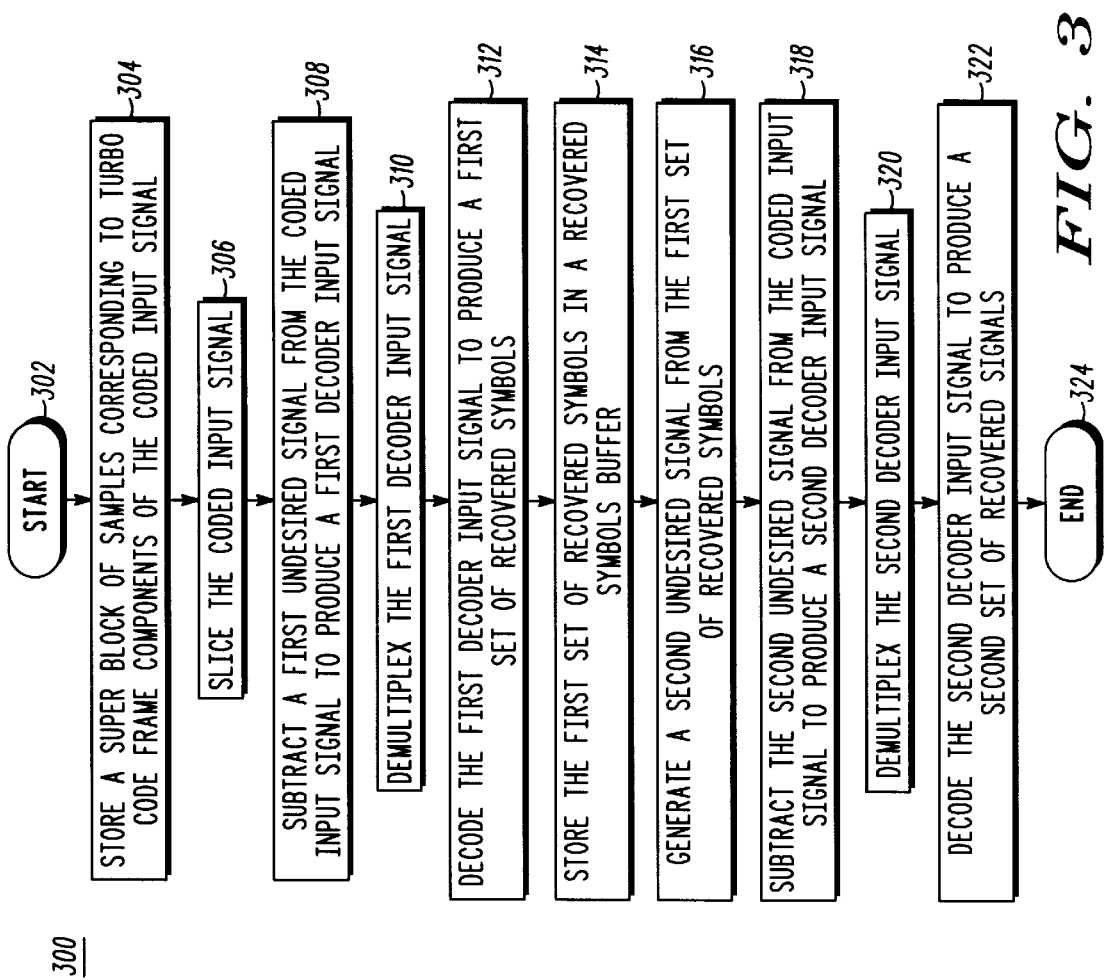
FIG. 3 is a logic flow diagram of steps executed by a joint detector in accordance with the preferred embodiment of the present invention.

The present invention can be more fully understood with reference to FIGS. 2 and 3. FIG. 2 is a block diagram depiction of a joint detector 200 in accordance with a preferred embodiment of the present invention. Filtered signal 201 is preferably the output of a matched filter bank and corresponds to y, as defined above. In the preferred embodiment, feed-forward equalizer 205 comprises functionality represented by the expression $D^{-1/2}L^{-1}y$, where y is a vector that corresponds to a coded frame of the filtered signal 201. y' represents the output of equalizer 205 in which precursor ISI and MAI is cancelled. y', the input signal of the present invention, preferably comprises a super block of samples, where each sample corresponds to a turbo code frame of a different signal component of the input signal. The input buffer 210 (the y' buffer) stores a super block of samples at a time. Thus, if K users having the same bit rate and using the same turbo encoder are assumed, then the input buffer 210 stores a super block of samples which correspond to K turbo code frames for K users.

Prior to the first decoding iteration of the present y' super block, selector 250 is in the A position, selecting slicer 260. Slicer 260 slices the output signal of feed-forward equalizer 205 (i.e., the present y' super block) to produce the first undesirable signal via signal generator 270. Signal generator 270 preferably comprises functionality represented by the expression $L_n^H-I$, where $L_n^H$ is a conjugate transpose of a normalized lower triangular matrix and I is an identity matrix. With the first iteration complete, selector 250 is placed in the B position for all subsequent iterations.

Signal adder 215 adds the first undesirable signal, generated during the first iteration, to the input signal (i.e., the present y' super block) to produce a decoder input signal. The present invention employs multiple decoders that each decode a portion of the decoder input signal. Demultiplexer 220 feeds each portion of the decoder input signal to a corresponding decoder. In the preferred embodiment, the all-bit turbo decoder pool 230 consists of a number of all-bit turbo decoders that can decode the K turbo code frames in a given time. These all-bit turbo decoders are modified conventional turbo decoders that can generate all coded bits with slightly more computation than conventional turbo decoders (see co-pending application, "TURBO DECODER WITH DECISION FEEDBACK EQUALIZATION"). These all-bit turbo decoders decode all bits of the corresponding decoder input signal portion (i.e., the individual turbo code frames) to produce recovered symbols.

The recovered symbols buffer 240 (s buffer) stores the recovered symbols produced by decoder pool 230. Preferably, the length of the s buffer is the total number of symbols corresponding to the super block of y'. Each memory element in the s buffer preferably only holds the most reliable hard decision of that symbol (i.e., a "1" or "−1") for the most recent iteration and is assigned for a particular symbol as follows:

$(s_1^{(1)}, s_1^{(2)}, \ldots, s_1^{(K)}, s_2^{(1)}, s_2^{(2)}, \ldots, s_2^{(K)}, s_3^{(1)}, \ldots, s_{KM}^{(1)}, \ldots, s_{KM}^{(K)})$ where M is the turbo code frame length. In other words, a particular all-bit turbo decoder output is stored in a fixed memory element (a 1 bit element) and the content of the memory element is updated for each iteration. By introducing this s buffer, each decoder can operate independently. Thus, there is no need for inter-decoder synchronization. Each decoder may work at its own pace and terminate at a different number of iterations as determined, for example, by different applications and stop criteria. If one decoder terminates early, the contents of the memory in s buffer allocated to that decoder are final decisions and kept unchanged for a given super block time.

Finally, to complete the present iteration, signal generator 270 generates a second undesired signal from the recovered symbols in the s buffer. This second undesired signal can then be added to the input signal to produce a second decoder input signal for the next iteration. Clearly, this preferred embodiment of the present invention can continue to perform as many iterations as are required to decode the input signal. Turbo coded signals, for example, typically require eight iterations.

With respect to the decoder pool of the preferred embodiment, if all K turbo coded users have the same bit rate, then K all-bit turbo decoders are needed (assuming each works on one turbo code frame). Otherwise, more than K decoders may be required. For example, if user 1 has a bit rate that is twice that of other users, then both y' and s buffers have a length of (K+1)M (since two turbo code frames are used by user 1) and therefore 2 all-bit turbo decoders are needed for user 1.

Also, an alternative embodiment of the present invention could support K users where some of them have convolutionally encoded signals. In this alternative embodiment, the decoder pool contains the required number of convolutional decoders with their outputs stored in particular memory elements of the s buffer just as the turbo decoder outputs are. However, since convolutional decoders do not operate iteratively (i.e., convolutional decoder outputs are final), the corresponding memory of the s buffer does not change with the iterations. In this alternative embodiment, the convolutional decoders are all-bit decoders. Since the convolutional codes specified in 3G mobile systems are non-recursive ones, generation of all coded bits is trivial given the trellis state transition sequence which is known for regular convolutional decoding. The present invention, therefore, is not limited by the make-up of the decoder pool. The decoder pool could, for example, include a turbo decoder, a convolutional decoder, and a reed-solomon decoder.

FIG. 3 is a logic flow diagram 300 of steps executed by a joint detector in accordance with the preferred embodiment of the present invention. The logic flow preferably begins (302) with the step of storing (304) a super block of samples, each of which corresponds to a turbo code frame of a different signal component of the coded input signal. The coded input signal, preferably the scaled output from a feed-forward equalizer, is sliced (306) to generate a first undesired signal. The first undesired signal is subtracted (308) from the coded input signal to produce a first decoder input signal. This first decoder input signal is demultiplexed (310) to produce multiple decoder input signal portions. Each of these portions corresponds to one of the decoders in a decoder pool, and each of the decoders in the decoder pool then decodes (312) its corresponding portion to collectively produce a first set of recovered symbols. These recovered symbols are preferably stored (314) in a recovered symbols buffer and then used to generate (316) a second undesired signal.

The second undesired signal is subtracted (318) from the coded input signal to produce a second decoder input signal, and this second decoder input signal is demultiplexed (320) to produce a second set of decoder input signal portions. Each of these portions corresponds to one of the decoders in the decoder pool, and each of the decoders in the decoder pool then decodes (322) its corresponding portion to collectively produce a second set of recovered symbols. Now this second set of recovered symbols may or may not be a final set of recovered symbols. It will depend on how many iterations of this subtract-and-decode cycle are required to decode the coded input signal. For turbo-coded signals, for example, eight such subtract-and-decode iterations are typically required before the logic flow ends (324).

Figure 4:
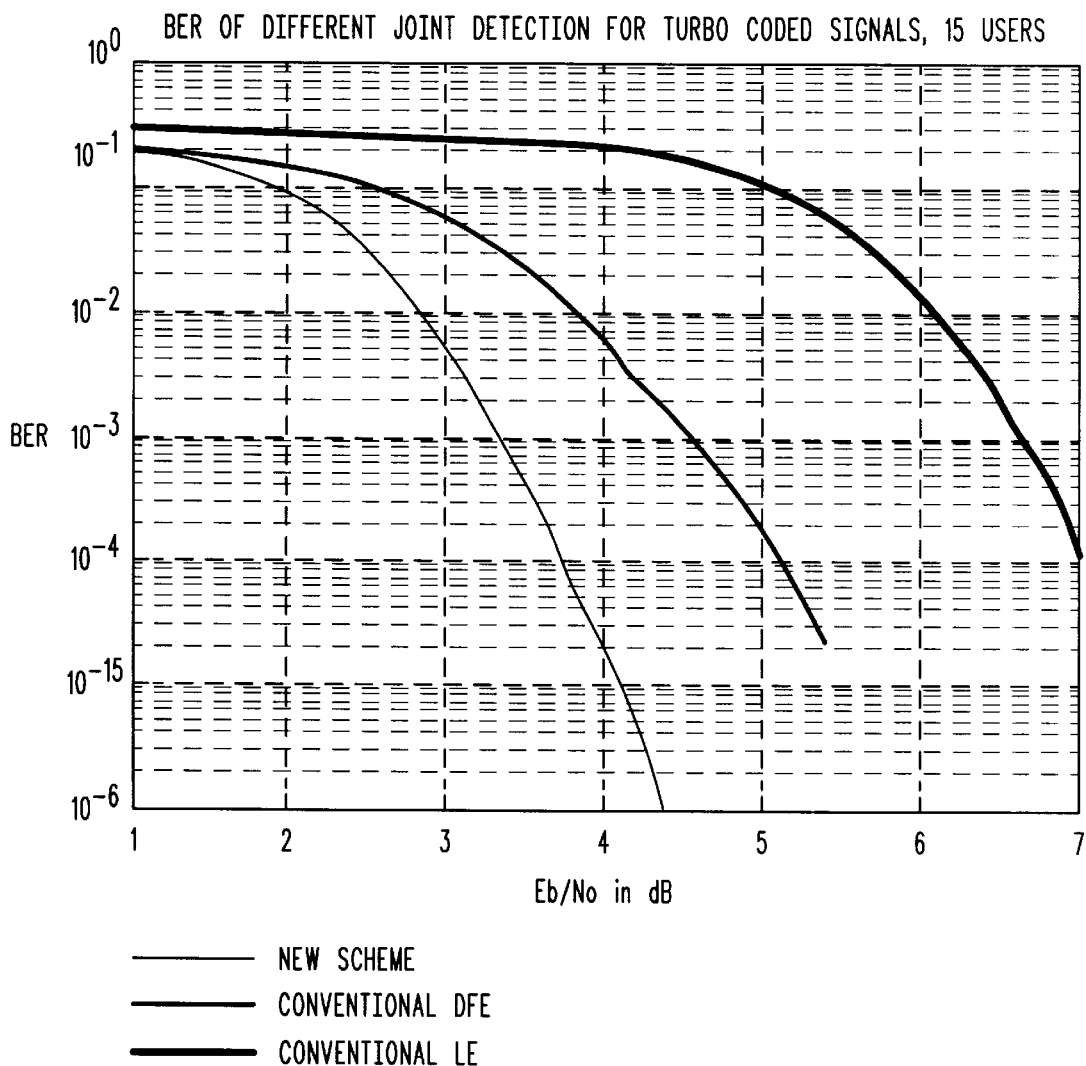
FIG. 4 is a graph comparing bit error rates of joint detection by prior art techniques to those of the preferred embodiment of the present invention.

FIG. 4 is a graph comparing bit error rates of joint detection by prior art techniques to those of the preferred embodiment of the present invention. Specifically, the graph shows simulation results for 15 turbo-coded users (i.e., K=15 with the decoding terminated at the 8$^{th}$ iteration) for conventional DFE (i.e., ZF-BDFE joint detection) and conventional LE (i.e., ZF-BLE joint detection) as compared to the new scheme (i.e., the preferred embodiment of the present invention). The results show that the preferred embodiment outperforms ZF-BDFE joint detection (with turbo decoder) by more than 1 dB and ZF-BLE joint detection (with turbo decoder) by more than 3 dB. Thus, the present invention improves upon the performance of the prior art, demonstrating its value to 3G mobile systems.

While the present invention has been particularly shown and described with reference to particular embodiments thereof, it will be understood by those skilled in the art that various changes in form and details may be made therein without departing from the spirit and scope of the present invention.

What is claimed is:

1. A method for joint detection of a coded input signal in CDMA system comprising:
   slicing the coded input signal to generate a first undesired signal;
   subtracting the first undesired signal from the coded input signal to produce a first decoder input signal;
   demultiplexing the first decoder input signal to produce a plurality of decoder input signal portions, each of which corresponds to a decoder of a plurality of decoders;
   decoding, by each decoder of the plurality of decoders, the corresponding decoder input signal portion to produce a first set of recovered symbols;
   generating a second undesired signal from the first set of recovered symbols;
   subtracting the second undesired signal from the coded input signal to produce a second decoder input signal;
   demultiplexing the second decoder input signal to produce a second plurality of decoder input signal portions, each of which corresponds to a decoder of the plurality of decoders; and
   decoding, by each decoder of the plurality of decoders, the corresponding decoder input signal portion of the second plurality of decoder input signal portions to produce a second set of recovered symbols.

2. The method of claim 1 wherein the coded input signal comprises scaled output from a feed-forward equalizer.

3. The method of claim 2 further comprising the step of storing a super block of samples, each of which corresponds to a turbo code frame of a different signal component of the coded input signal.

4. The method of claim 2 wherein the feed-forward equalizer functionality is represented by the expression:

$$D^{-1/2}L^{-1}y$$

wherein y is a vector that corresponds to a coded frame, D is a diagonal matrix, and L is a lower triangular matrix.

5. The method of claim 1 further comprising the step of storing the first set of recovered symbols in a recovered symbols buffer.

6. The method of claim 1 wherein the plurality of decoders comprises an all-bit turbo decoder that decodes all bits of the corresponding decoder input signal portion.

7. The method of claim 1 wherein the step of generating comprises functionality represented by the expression:

$$L_n^H - I$$

wherein $L_n^H$ is a conjugate transpose of a normalized lower triangular matrix and I is an identity matrix.

8. A CDMA joint detector apparatus comprising:
   a signal adder capable of adding a first undesirable signal to an input signal to produce a decoder input signal;
   a plurality of decoders, wherein each decoder is capable of decoding a portion of the decoder input signal to produce recovered symbols;
   a demultiplexer, coupled to the signal adder and the plurality of decoders, capable of feeding each portion of the decoder input signal to a corresponding decoder of the plurality of decoders;
   a recovered symbols buffer, coupled to the plurality of decoders, capable of storing the recovered symbols;
   a selector, coupled to the recovered symbols buffer;
   a signal generator, coupled to the adder and the recovered symbols buffer via the selector, capable of generating a second undesired signal from the recovered symbols for addition to the input signal to produce a second decoder input signal when the recovered symbols buffer is selected by the selector; and
   a slicer, coupled to the adder via the selector, capable of slicing an adder output signal to produce the first undesirable signal via the signal generator when selected by the selector.

9. The apparatus of claim 8 wherein the plurality of decoders comprises decoders selected from the group of decoders consisting of a turbo decoder, a convolutional decoder, and a reed-solomon decoder.

10. The apparatus of claim 8 wherein the plurality of decoders comprises an all-bit turbo decoder that decodes all bits of the corresponding decoder input signal portion.

11. The apparatus of claim 8 further comprising a feed-forward equalizer that equalizes a filtered signal to produce the input signal.

12. The apparatus of claim 11 wherein the feed-forward equalizer comprises functionality represented by the expression:

$$D^{-1/2}L^{-1}y$$

wherein y is a vector that corresponds to a coded frame of the filtered signal, D is a diagonal matrix, and L is a lower triangular matrix.

13. The apparatus of claim 8 further comprising an input buffer that stores a super block of samples, each of which corresponds to a turbo code frame of a different signal component of the input signal.

14. The apparatus of claim 8 wherein the signal generator comprises functionality represented by the expression:

$$L_n^H - I$$

wherein $L_n^H$ is a conjugate transpose of a normalized lower triangular matrix and I is an identity matrix.

15. The apparatus of claim 8 wherein each memory element of the recovered symbols buffer is assigned for a particular symbol s as follows:

$$(s_1^{(1)}, s_1^{(2)}, \ldots, s_1^{(K)}, s_2^{(1)}, s_2^{(2)}, \ldots, s_2^{(K)}, s_3^{(1)}, \ldots, s_{KM}^{(1)}, \ldots, s_{KM}^{(K)})$$

wherein M is the length of code frames in the input signal and K is the number of code frames in the input signal.

* * * * *